US012661610B2

(12) United States Patent
Chabo et al.

(10) Patent No.: US 12,661,610 B2
(45) Date of Patent: Jun. 23, 2026

(54) METHOD AND DEVICE FOR TREATING PROCESS AIR

(71) Applicant: Dürr Systems AG, Bietigheim-Bissingen (DE)

(72) Inventors: Houver Chabo, Heilbronn (DE); Jens Altmann, Freiberg (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 89 days.

(21) Appl. No.: 18/721,978

(22) PCT Filed: Dec. 16, 2022

(86) PCT No.: PCT/DE2022/100966
§ 371 (c)(1),
(2) Date: Jun. 20, 2024

(87) PCT Pub. No.: WO2023/116978
PCT Pub. Date: Jun. 29, 2023

(65) Prior Publication Data
US 2025/0083085 A1      Mar. 13, 2025

(30) Foreign Application Priority Data

Dec. 22, 2021    (DE) ..................... 10 2021 006 308.2
Feb. 11, 2022    (DE) ..................... 10 2022 000 536.0

(51) Int. Cl.
 *B01D 53/00* (2006.01)
 *F24F 8/10* (2021.01)
(52) U.S. Cl.
 CPC ............. *B01D 53/002* (2013.01); *F24F 8/10* (2021.01); *B01D 2257/702* (2013.01); *B01D 2258/02* (2013.01)

(58) Field of Classification Search
 CPC ............ B01D 53/002; B01D 2257/702; B01D 2257/704
 See application file for complete search history.

(56) References Cited

U.S. PATENT DOCUMENTS 5,566,555 A * 10/1996 Hewitt ..................... B01D 8/00
                                                          62/623
9,403,122 B2 * 8/2016 Geckeler ............... B01D 53/72
(Continued)

FOREIGN PATENT DOCUMENTS

CA        2214542 A1    3/1998
EP        3875569 A1    9/2021
WO    2021/007295 A1    1/2021

OTHER PUBLICATIONS

International Search Report and Written Opinion mailed Mar. 29, 2023 in corresponding PCT application No. PCT/DE2022/100966.

*Primary Examiner* — Lionel Nouketcha
(74) *Attorney, Agent, or Firm* — 2SPL Patent Attorneys PartG mbB; Kieran O'Leary

(57) ABSTRACT

The invention relates to a method for treating process air from an industrial process involving a main flow, wherein at least a proportion of the process air is treated using the following method steps: a first condensation step, in which a first condensate is separated out of the process air and is fed to a first recovery process; and a second condensation step, which takes place after the first condensation step and in which a second condensate is separated out of the process air and is fed to a second recovery process, wherein the lowest process air temperature that is reached in the second condensation step is lower than the lowest process air temperature that is reached in the first condensation step.

21 Claims, 9 Drawing Sheets

(56)        References Cited

U.S. PATENT DOCUMENTS

Figure 1:
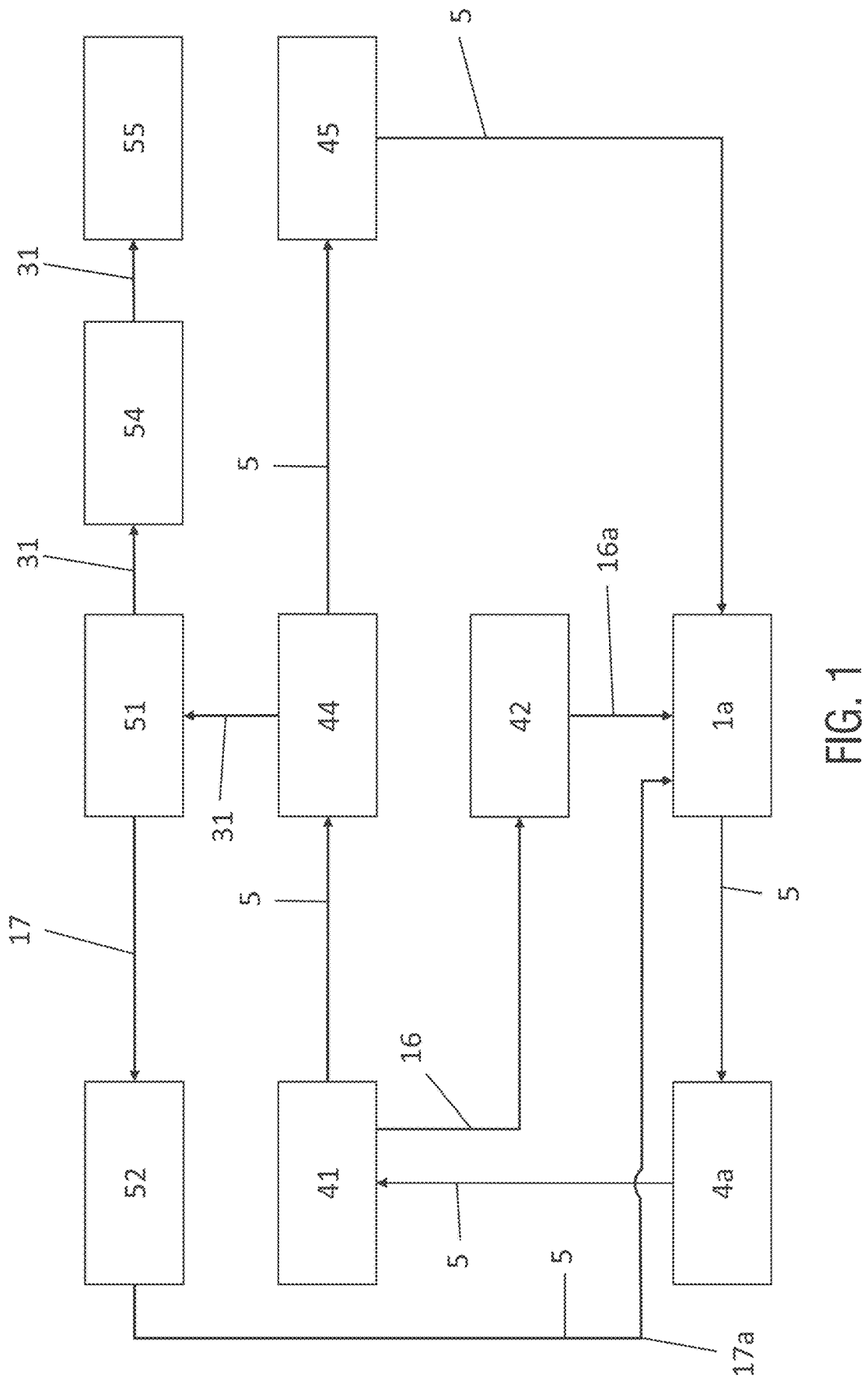

| | | | |
|---|---|---|---|
| 11,731,073 B2 * | 8/2023 | Schubring ............ | B01D 53/265 |
| | | | 96/145 |
| 12,102,955 B2 * | 10/2024 | Schubring ............ | B01D 5/0027 |
| 2012/0118012 A1 * | 5/2012 | Bailey ................... | C01B 17/167 |
| | | | 62/619 |
| 2018/0056236 A1 * | 3/2018 | Philbrook ................ | B01D 3/14 |
| 2021/0008488 A1 * | 1/2021 | Schubring .......... | B01D 53/0423 |

* cited by examiner

METHOD AND DEVICE FOR TREATING PROCESS AIR

TECHNICAL FIELD

The present invention relates to a process for treating process air from an industrial process.

PRIOR ART

Process air can be used as medium in certain process steps for production of products, in order to bring about certain technical effects such as drying in a process step. In industrial processes, the process air can take up operating media, and the process air is released into the environment after leaving the industrial process. However, such operating media can contain pollutants that have an adverse effect on the environment. In order to reduce the adverse effect on the environment, this waste air must be treated appropriately, also in order to comply with legal limits on pollutants in the waste air to be released into the environment.

The treatment of process air from an industrial process may comprise cleaning of the air to free it of solvents used in industrial processes. Such a treatment may, as mentioned above, be occasioned for regulatory reasons for release into the environment and/or else for economic reasons for general further use in further industrial processes; the latter may be the case particularly in the case of use of particularly valuable solvents.

The prior art especially discloses methods having a condensation step, wherein condensates are separated out of the process air and solvents can be recovered thereby.

CA2214542A1 discloses a method in which a solvent can be recovered in the production of lithium-ion batteries by condensing the solvent out of solvent-containing process air.

The present invention relates to a method of treatment of process air, especially of recovery of solvents that are used in industrial processes, such as in the production of lithium-ion batteries. The method comprises condensation operations that work at different temperature levels, wherein a solvent-containing condensate is separated out of the process air and then sent to a recovery process. The present invention likewise relates to an apparatus for treatment of process air from an industrial process, especially for execution of a method of the invention.

SUMMARY OF THE INVENTION

It is the object of the present invention to specify an improved method of recovering condensate from process air.

This object is achieved in accordance with the invention by a method of treatment of process air from an industrial process with a main stream, wherein at least a portion of the process air is treated by the following method steps: a first condensation step in which a first condensate is separated out of the process air and fed to a first recovery process, a second condensation step that takes place after the first condensation step, in which a second condensate is separated out of the process air and fed to a second recovery process, wherein the lowest process air temperature attained in the second condensation step is lower than the lowest process air temperature attained in the first condensation step.

To wit, the inventors have found that it can be advantageous for the recovery of solvent-containing condensate in particular to treat the process air by two condensation steps, wherein the process air is cooled to a lower temperature in the second condensation step than in the first condensation step. With the aid of the two-stage treatment, the process air can be treated more intensively and hence a higher proportion of solvents can be separated out of the process air than is possible by a one-stage condensation process. The method of the invention is found to be particularly advantageous over an alternative method with a concentrator downstream of the first condensation step, wherein the solvent is adsorbed by the concentrator, especially when the solvent to be adsorbed has a comparatively low vapor pressure.

This object is achieved in accordance with the invention, in an alternative of equal status, by a method of treatment of process air from an industrial process with a main stream and a secondary stream, wherein at least a portion of the process air is treated by the following method steps: a first condensation step in which a first condensate is separated out of the process air and fed to a first recovery process. A portion of the process air is branched off into the secondary stream after the first condensation step in a first branch. In addition, a portion of the process air, after the first condensation step, is subjected to further treatment in a first further treatment step, wherein the first further treatment step comprises a supply of heat, and/or a lowering of pressure, and/or a second feed of air outside the main stream.

After the first further treatment step, a portion of the process air, in a second branch, is preferably branched off by means of an auxiliary conduit into the secondary stream and supplied to the process air in the secondary stream.

"A" and "an", in the context of this disclosure, without an explicit statement to the contrary, should be read as the indefinite article and hence always also as "at least one", meaning that two or more second condensation steps may thus also be provided after two or more first condensation steps. The first or second condensation step may in each case also be regarded as a multistage first or multistage second condensation step. In particular, a first or second condensation step may comprise two or more condensation operations (see below). Statements of directions such as "after" or "before" in the process relate generally to the direction of flow. For example, the wording "after the first condensation step" or "before the second condensation step" shall be understood to mean, respectively, "downstream of the first condensation step" and "upstream of the second condensation step". A cooling circuit especially has a heat source and a heat sink, where thermal energy can be transported from the heat source to the heat sink. In particular, the heat sink may comprise an environment or an industrial apparatus, for example a heat exchanger or a heating apparatus.

The method of the invention is preferably suitable for treatment of process air that was involved in an industrial process, for example in the drying of a coating for production of lithium-ion batteries, especially of electrodes, separators and/or membranes for secondary batteries or fuel cells. In the method of the invention, at least a portion of the process air is directed into the main stream to the first condensation step. The main stream preferably constitutes a continuous flow of the process air in the method. The main stream preferably comprises the flow which is directed from the industrial process to the first condensation step, i.e. preferably the majority of the process air conducted to the first condensation step. In particular, the spatial extent of the main stream also encompasses that flow space in which the first condensation step takes place. The process air is preferably treated entirely in the first condensation step in the method.

In a further embodiment, the spatial extent of the main stream could also include that flow space in which the second condensation step takes place. In this case, the main stream would thus be conducted first through the first condensation step and then through the second condensation step.

It is particularly preferable, however, that the second condensation step is outside the main stream, i.e. the main stream is conducted solely through the first, but not through the second condensation step.

The process air may be a gas mixture, wherein at least one constituent is condensable. In particular, such a constituent comprises a solvent. A solvent constituent may, for example, be N-methyl-2-pyrrolidone (NMP), triethyl phosphate (TEP), ethylene-acrylic acid copolymer (EAA), dimethyl-acetamide (DMAc) or else water, acetone or alcohol. In the first and second condensation steps, the process air can preferably flow through and be cooled in a heat exchanger, such that heat from the process air can be released to the heat exchanger. Cooling of the process air can give rise to aerosols in the air, which are then directed through internals for trapping of droplets. In this way, it is possible to condense out, collect and then separate out solvents and/or water.

The first condensate separated out of the process air, after being separated out, is fed to the first recovery process. The feeding into the first recovery process may also comprise multiple intermediate steps that serve for recovery. Such intermediate steps may include collecting of condensate in the first condensation step or else feeding through a conduit into a vessel outside an apparatus in which the condensation step is performed. The first condensate can also be conveyed directly into a recovery process by means of a pump. This likewise includes further intermediate steps such as purifying, reactivating, clarifying or heat treatment of the condensate. In the case of the feeding into the first recovery process, a condensate can be freed of soil by a filtering operation, then chemically activated and brought to a particular temperature. The first recovery process may preferably commence immediately after the separation and comprise merely removal of the condensate, for example to a collection vessel, which may then be followed by a separate subsequent process. The first condensate is thus not subjected to further processing in this case in the first recovery process, but merely removed after being condensed out of the process air.

The second condensate may preferably be separated out of the process air analogously to the first condensate and fed to the second recovery process. The feeding of the second condensate into the second recovery process, as in the case of the first condensate, may preferably comprise multiple intermediate steps that serve for recovery.

The second recovery process, analogously to the first recovery process, may also comprise merely removal from the second condensate after the separation, meaning that it is also not processed further in this case.

The process air reaches a lower temperature in the second condensation step than in the first condensation step. The process air temperature in the second condensation step may thus also be lower on average than in the first condensation step. The process air may reach a lowest temperature in the first condensation step of about 25° C., 20° C., 15° C. or less. In the second condensation step, the process air, by contrast, may reach a lowest temperature of –5° C. or less.

A condensation step may especially comprise two or more cooling stages, i.e., for example, two or more series-connected cooling elements or heat exchangers, before the process air is heated up again. In the case of multistage cooling of the process air in a condensation step, the lowest temperature attained should be considered to be the lowest temperature over all cooling stages. By virtue of the differently lowest temperatures attained in the first and second condensation steps, different solvent constituents of the process air each with different dew points can each be separated out separately in the first and second condensation steps. A condensation step preferably takes place in a respective condenser; in particular, all cooling stages of a condensation step may take place in a respective condenser. A condensation step preferably has at least two cooling stages, more preferably three cooling stages.

In a preferred configuration, a coolant is used in a cooling stage for cooling of the process air in a condensation step, wherein heat is withdrawn from the process air in a heat displacement in the cooling stage and transferred to the coolant. The coolant may be a cooling fluid, especially a cooling liquid, for example water. The coolant may be spatially separate from the process air; for example, the coolant may circulate in a cooling circuit spatially separate from the process air. More preferably, two or more cooling stages in a condensation step have a respective coolant, for example have a first coolant in the first cooling stage and a second coolant in the second cooling stage. It is optionally possible for the cooling stages also to have respectively separate cooling circuits. The heat withdrawn from the process air in the cooling operation can then be added to the process air in a further treatment step. The heat displacement may thus take place by means of the coolant between the condensation step and the further treatment step, meaning that thermal energy is transferred from the process air from the condensation step to the further treatment step. The coolant, especially a cooling liquid, may thus assure a high cooling output in the cooling stage. In particular, the cooling output in an air-water heat exchanger may be higher than an air-air heat exchanger. Preference is given to using a coolant for cooling of the process air even in the first cooling stage, where the heat withdrawn from the process air in the first cooling stage is added to the process air in a further treatment step. The heat displacement can simply be implemented by means of pumped circulation of coolant. It is optionally also possible to implement the heat displacement by means of a heat pump.

Alternatively or additionally, separation in the sense of a condensation step is likewise conceivable, where a pressure of the process air, for example before or during a condensation step, is increased by a compression operation by means of a compressor, in order likewise to increase the partial pressures of the constituents. This can achieve a higher separation rate per unit volume of process air. Preference is given here to expanding process air back to a lower pressure level after the condensation step; in particular, the pressure level is lowered to a value corresponding to the pressure level of the incoming process air. A volume flow does of course also mean a mass flow, in that the density may be variable. However, in the statements with regard to the volume flow, it is preferable that the density is assumed to be constant for description and for comparison of the volume flow rate. In that case, the volume flow rate is thus proportional to the mass flow rate. In condensation steps, it may generally be the case that a condensate can form.

Preferred configurations are described in the dependent claims and figures, although there will not always be specific distinction between aspects of the apparatus and method or use in the description of the features.

In a preferred configuration, by means of the method of the invention, at least one solvent is recovered, wherein the first condensate includes a first solvent and the second condensate includes a second solvent, wherein first and/or second solvents in particular comprise a hydrocarbon compound. In particular, the first and second solvents may be identical and may nevertheless have different concentrations or purities in the respective condensate. Both the first and second solvents are especially used in an industrial process for production of lithium-ion batteries, where they are transferred into process air via a drying process. The solvents are at least partly separated out of the process air again with the aid of the method of the invention.

The process air involved in an industrial process is thus preferably a carrier of an organic solvent which is especially gaseous at process temperature, which preferably comprises at least one hydrocarbon compound. Solvents having gaseous organic constituents are also known as solvents with volatile organic compounds (VOC solvents), and may especially include NMP, TEP, EAA, DMAc or the like.

Likewise conceivable is a method of recovering a solvent, wherein the first condensate comprises a first solvent and the second condensate comprises a second solvent, wherein the first and/or second solvent includes an inorganic solvent. Inorganic solvents are suitable for dissolution of organic binders for formation of paints or coatings. In particular, an inorganic solvent may also comprise water.

In a further preferred configuration, the method of the invention has a volume flow in the main stream and in a secondary stream, in which at least a portion of the process air, after the first condensation step, is branched off in a branch into the secondary stream for treatment by the second condensation step, wherein the volume flow branched off into the secondary stream is especially smaller than the volume flow present in the main stream downstream of the branch. The process air is preferably divided after the first condensation step into at least two streams, for example into a main stream and a secondary stream. Even in the case of branching into two or more secondary streams, the volume flow branched off in total, which is added up over all the secondary streams, is preferably smaller than the volume flow present that remains in the main stream downstream of the branch. Only a smaller portion of the process air is thus branched off from the main stream into the secondary stream and then treated by the second condensation step.

The treatment by the second condensation step of merely a relatively small portion of the process air is advantageous in that less energy is required for the cooling in the second condensation step than the energy expenditure required to condense a majority of the process air in the second condensation step. Such a method regime also enables more flexible control of the amount of air to be condensed in the second condensation step according to economic criteria.

In a further preferred configuration of the invention, at least a portion of the process air is subjected to further treatment in a first further treatment step after the first condensation step, wherein the first further treatment step comprises a supply of heat and/or a lowering of pressure and/or a second feed of air from outside the main stream, especially from an environment and/or from a secondary stream, wherein at least a portion of the process air is recycled to an industrial process after the first further treatment step. More preferably, the first further treatment takes place downstream of the branch in the main stream. The process air present in the main stream is thus preferably subjected to further treatment in the first further treatment step after the first condensation step. With regard to the main stream, the branch is thus downstream of the first condensation step and upstream of the first further treatment step.

The first further treatment step may also comprise a supply of heat, a lowering of pressure and a second feed of ambient air or process air from outside the main stream, for example from a secondary stream. It is likewise conceivable that a portion of the process air that was present in the secondary stream beforehand, i.e. upstream, is subjected to further treatment in the first further treatment step after the first and second condensation steps. The process air in the secondary stream may thus be guided through the second condensation step before being subjected to further treatment in the first further treatment step. It is preferable, however, that the process air is already subjected to further treatment in the first further treatment step after the first condensation step. The main stream may thus merely be conducted through the first, but not through the second condensation step. For this purpose, the main stream is preferably divided after the first condensation step, in which case the main stream is returned and the secondary stream is fed to the second condensation step. Optionally conceivable is a feed to the first further treatment step from the main stream and the secondary stream. The process air may thus be combined from the main stream and the secondary stream in the first further treatment step and be subjected to further treatment.

The first further treatment step may comprise any combination of the further treatment measures described. The process air may preferably first be heated, in which case ambient air may then be fed into the process air before the process air is heated further again. It is likewise conceivable that, in the first further treatment step, expansion of the process air is followed by heating of the process air and supply of air from a (natural) environment before the process air is heated again. In an alternative execution, in the first further treatment step, air from a secondary stream and from a (natural) environment is added to the process air. In a further possible execution, process air is added exclusively from a secondary stream; see below in the working example for further details. The further treatment of the process air in the first further treatment step can increase the uptake capacity of the process air for solvents from the industrial process.

In the case of an increase in the drying capacity in the industrial process, the method of the invention may also briefly increase the conveying output overall in that the supply of ambient air to the first further treatment step is increased.

In a further preferred configuration of the invention, the first further treatment step takes place downstream of the branch. Preferably, the branch follows downstream of the first condensation step, before a relatively small portion of the process air is branched off and guided as secondary stream to the second condensation step. The branching thus takes place, with regard to the main stream, between the first condensation step and the first further treatment step, i.e. is positioned upstream of the first further treatment step. The second condensation step may thus take place in the secondary stream. It is particularly preferable that the branching is effected prior to heating of the main stream in the first further treatment step.

The portion of the process air that remains in the main stream downstream of the branch may be subjected to further treatment by the first further treatment step downstream of the branch. This is because such a method regime combines at least three significant advantages: firstly, the process air branched off as secondary stream has already been cooled down after the first condensation step, i.e. is cooler, for example, than after the first further treatment step, before the process air is brought to an even lower temperature by the second condensation step. Secondly, merely a relatively small portion of the process air is branched off from the main stream and treated by the second condensation step. The volume flow, to be cooled overall, of the branched-off process air is thus smaller than that of the main stream. Thirdly, the process air in the main stream is heated up again, for example, by the first further treatment step for recycling into the industrial process after only one, i.e. after the first, condensation step. In other words, the combination of these at least three advantages leads specifically to a significantly more efficient overall process because only a relatively small volume flow is condensed out at relatively low temperatures, but the residual volume of the process air is cooled to a lesser degree and hence also has to be heated less significantly for recycling into the industrial process.

In a further preferred configuration of the invention, at least a portion of the process air is subjected to further treatment in a second further treatment step after the second condensation step, which second further treatment step comprises a supply of heat, and/or a lowering of pressure, and/or a filtering operation and/or a third condensation step and/or an adsorbing operation. Preferably, the process air treated in the second condensation step is then heated in the second further treatment step and directed through a filter, for example through an activated carbon filter, in order to free the process air even further from solvent. The filter used may thus be chosen such that the process air that flows through can meet legal emissions limits, especially for release into an environment. In an alternative execution, the second further treatment step may comprise a third condensation step. The third condensation step may reach an even lower temperature than is the case in the second condensation step. Likewise conceivable in the second further treatment step is the use of a concentrator in order to remove further solvent constituents of the process air by adsorption. It is also possible in the second further treatment step to combine a third condensation step with a filtering operation or with an adsorption operation in order to enable the second further treatment possibly with better matching to the respective solvent constituents in the process air.

More preferably, the secondary stream is directed through the second condensation step and then subjected to further treatment by the second further treatment step. It is usually possible, however, to discharge at least a portion of the process air downstream of the second further treatment step into the environment as waste air.

In a further preferred configuration of the invention, a portion of the process air is returned to an industrial process downstream of the second further treatment step. The process air, downstream of the second further treatment step, may be made available to a further process that subjects the process air to further processing. In particular, the process air may be returned indirectly to the industrial process in that the process air is preconditioned for use in the industrial process, for example is subjected to further treatment in the first further treatment step.

In a further preferred configuration of the invention, at least a portion of the process air from the industrial process is guided into the main stream and at the same time filtered. The industrial process can give rise to particles that are carried along as the process air is guided out of the industrial process. In order that such particles preferably do not get into the first condensation step, a filter may be used in the guiding of the process air into the main stream, in order to filter out the particles. In principle, the term "filtering" also means any other deposition of particles. An electrostatic separator and/or a cyclone may thus likewise be considered. The filter is thus preferably disposed upstream of the first condensation step. The filter may especially be a filter system that minimizes the pressure drop in the filtering operation. The filter used is preferably matched to the particle size, such that different types of filter may be used for different industrial processes.

In a further preferred configuration of the invention, the industrial process comprises a drying process; in particular, the industrial process is part of a production process for production of lithium ion batteries. In particular, the industrial process may include a coating process, for example for coating of electrodes and metal foils. The industrial process may likewise include a membrane manufacturing operation. The industrial process may alternatively be part of a production process for production of wood products, wherein a solvent used is dried.

In a further preferred configuration of the invention, the method of the invention includes collection of the first condensate in the first recovery process and/or collection of the second condensate in the second recovery process for recycling into an industrial process. In the first or second recovery process, it is preferably the first or second separated condensate that is collected. The collecting of the condensate may also be an intermediate storage stage before a solvent constituent of the condensate is returned to an industrial process. The recycling into an industrial process and reuse in that industrial process may present certain technical demands on the collected condensate, and therefore the collected condensate has to be processed in further process steps. The recycling into an industrial process thus optionally also includes multiple processing steps for achievement of the required properties, for example purities, for use in an industrial process.

This is because the condensate separated out of the process air may include an aqueous solvent mixture. The processing of the condensate for recycling into an industrial process may especially comprise distillation in order to separate the solvent constituents present in the condensate and/or to increase the concentration of the respective solvent constituents. The distillation temperature for separation and/or enrichment of the second condensate may also be different than the distillation temperature for the first condensate.

It is likewise conceivable that merely the first condensate is collected in the first recovery process for recycling into a/the industrial process, and not the second condensate in the second recovery process. Under certain circumstances, it may possibly be the case that reprocessing of the second condensate for recycling into a/the industrial process is economically unviable, and therefore collection and recycling of the second condensate may optionally be dispensed with.

In a further preferred configuration of the invention, the method of the invention includes heat recovery in the first and/or second and/or third condensation step. Preferably, the heat withdrawn in the respective condensation step is recovered, for example, by means of a heat exchanger or a heat pump. The heat recovered is preferably added again to the process air in a heating operation in the method, more preferably within a condenser, such that the distance over which heat is transported can be minimized in order to avoid losses. Likewise conceivable is use of the heat recovered in an industrial process, i.e. addition of the heat recovered from the respective condensation step to an industrial process.

In a further preferred configuration of the invention, deicing takes place during the second condensation step, wherein the feed of at least a portion of the process air to the second condensation step is intermittently interrupted and/or at least a portion of the process air bypasses the second condensation step and/or the feed of the process air to the second condensation step is divisible, wherein the deicing takes place in one substream. In particular, it may be the case that the water vapor present in the process air is separated out in the second condensation step in the form of solid particles (ice) by virtue of the low temperature and is deposited, for example, on a cooling fin in a heat exchanger. The heat transfer can be impaired by the deposition of ice on a cooling fin or a heat transfer surface in general. In the deicing operation, the heat transfer surface is freed of ice, such that the full functioning of the heat exchanger can be restored. The deicing operation can be effected by an addition of heat in order to thaw the ice. Heat can be supplied, for example, via a fluidic heating circuit (for example by means of an additional heat exchanger or changeover of an operating medium circuit of the heat exchanger of the condenser that functions as cooling media circuit to at least temporary supply of heated deicing medium) and/or electrical heating elements. It is also conceivable, in addition to the addition of heat or as an alternative, to conduct chemical deicing via the addition of deicing fluid. Deicing fluid can be added, for example, by spraying the heat transfer surface. In particular, the second condensate may contain a solvent that can be used as deicing fluid for deicing.

A portion of the process air may bypass the second condensation step in the deicing operation. The process air is thus diverted upstream of the entry into the second condensation step and fed, for example, to a flow channel downstream of the second condensation step. In particular, the supply of process air to the second condensation step can be intermittently interrupted in the case of deicing and can bypass the second condensation step for the duration of the deicing. A continuous flow can thus be assured even during deicing.

The supply of the process air to the second condensation step, even in the case of deicing, can be divided into at least two substreams, preferably at least two substreams supplied alternately or alternatingly with process air, upstream of the second condensation step. The volume flow in a substream may especially correspond to the volume flow of the secondary stream, i.e. the secondary stream can be passed through completely in a substream. By virtue of the division of the process air upstream of the second condensation step, it is possible, for example, to deice a substream while another substream is being treated by the second condensation step. The substreams may thus run in parallel, and both the deicing and the second condensation step may be operated in parallel, such that a second condensate can still be separated out at least in one substream during the deicing. A continuous flow can likewise be assured with this solution.

The deicing may especially also take place simultaneously with the second condensation step in that part of the flow area is deiced. In such an execution, the deicing can take place locally, i.e. in parts, such that the condensation can especially still take place at different sites in the flow area.

The deicing can be understood such that a deicing process has at least been started even when physical deicing, i.e. in the case of an actual change of state from the solid phase to the liquid phase, has not yet set in. The deicing likewise includes a certain period or a time delay after the physical deicing, in order, for example, to enable removal of water. Likewise conceivable is deicing with an anticipatory deicing method in which relevant operating parameters are recorded and monitored in order that the deicing means can be applied to the surfaces to be deiced at such a time that the ice removal operations can be limited to such an extent that temporary interruptions of the second condensation step for deicing can be at least reduced or even prevented.

The present invention further relates to an apparatus for treatment of process air from an industrial process, preferably for execution of an above method.

It is further the object of the present invention to specify an advantageous apparatus for the treatment of process air from an industrial process for recovery of condensate.

This object is achieved in accordance with the invention by an apparatus for treatment of process air from an industrial process, especially for execution of the method described above with a main stream, a first condenser having a first cooling element and a first separator, wherein the process air is cooled by the first cooling element within the first condenser and then passed through the first separator, wherein a first condensate is separated out of the process air and fed to a first recovery process. Also provided in accordance with the invention is a second condenser connected downstream of the first condenser, which has a second cooling element and a second separator, wherein the process air is cooled by the second cooling element in the second condenser and then passed through the second separator, wherein a second condensate is separated out of the process air and fed to a second recovery process.

Preferably, the main stream from the industrial process is guided into a first condenser. The process air is preferably passed through the latter via a first cooling element. In particular, the first cooling element may be a heat exchanger having cooling fins, especially part of a heat pump or a cooling circuit, by means of which heat can be withdrawn from the process air and transferred to a cooling medium or heat exchanger fluid. The cooling can result in deposition of condensate on a heat transfer surface, for example on the cooling fins, which can result in deposition of a first condensate. Downstream of the first cooling element is preferably disposed a separator, through which the process air can likewise be passed. Aerosols can likewise form as a result of the cooling, which can likewise be passed through the separator. As a result, further condensate can be collected from the separator in the form of fine droplets. The separator may especially be an impingement separator or demister, having a wire mesh for example.

According to the invention, the second condenser is connected downstream of the first condenser. In this case, the process air is thus preferably passed through the first condenser before the process air is treated in the second condenser. In particular, the apparatus gives the option of multiple second condensers being able to be disposed downstream of the first condenser, i.e. that the second condensers may be disposed parallel to one another and simultaneously in series with the first condenser.

The second condenser, like the first condenser, has a second cooling element and a second separator, but the second condenser is designed such that the process air is cooled down therein such that the lowest temperature reached in the second condensation step is lower than the lowest temperature reached in the first condensation step. In particular, in the second condenser, it is possible to use a coolant or heat exchanger fluid which is chemically different from the first condenser and which has a lower operating temperature than the coolant in the first condenser.

More preferably, the first and second condensers each have a multistage cooling element in which multiple cooling bodies, especially heat exchangers, may be disposed in series, through which the main stream may be passed.

Preferably, the process air is cooled gradually down to a target temperature by the multistage cooling element. The separator may preferably be disposed behind the multistage cooling element. It is optionally also possible for a separator to be disposed between two respective cooling bodies. For recovery of the first or second condensate, the condenser may have a collecting vessel and a condensate pump in order to convey the first or second condensate separated out into a respective recovery process.

In a preferred configuration of the invention, the apparatus has a diversion apparatus, wherein at least a portion of the process air is branched off into a secondary stream behind the first separator in a branch, wherein the diversion apparatus preferably has a first control unit and/or a first valve and/or a fan for guiding of at least a portion of the process air.

Preferably, a portion of the process air is branched off from the main stream into a secondary stream after the first condensation step in a branch. In particular, the branch may be implemented in a technically particularly simple manner in that, for example, a leadthrough or hole in a wall surface of a first flow channel is arranged such that process air can escape from the main stream into a second flow channel. Preferably, however, a portion of the process air is guided and branched off from the main stream into the secondary stream by means of a first valve and a fan of the diversion apparatus. It is possible here for a first control unit to control the guiding of the process air into the secondary stream, i.e. to regulate the flow rate branched off into the secondary stream. The branching-off may especially be regarded as tapping-off from the main stream. The diversion apparatus, especially the first valve, may be disposed in the first condenser. More preferably, the first valve is disposed downstream of the first separator in order that process air can be branched into the secondary stream in the first condenser downstream of the separator. In particular, the first valve can also reduce or even completely stop the supply of process air into the secondary stream if the branching-off is unwanted in a particular state of operation.

In a further preferred configuration of the invention, the first cooling element especially comprises a first heat exchanger for heat recovery in the first condensation step, wherein at least a portion of the process air is subjected to further treatment in the first condenser after the first condensation step, wherein the first condenser includes a first heating element for heating of the process air, wherein the apparatus especially includes a first air heater downstream of the first condenser.

Preferably, a portion of the process air is subjected to further treatment in the first condenser downstream of the first condensation step, i.e. preferably behind the first cooling element and the first separator. More preferably, the first cooling element comprises the first heat exchanger. Likewise preferably, the first heating element is a heat exchanger connected to the first heat exchanger. In the case of further treatment in the first condenser, the heat withdrawn from the process air in the first heat exchanger is preferably utilized for reheating the process air via a heat pump or a cooling circuit. The cooling circuit preferably comprises a coolant, especially a cooling liquid, e.g. water, where the coolant transports heat from the cooling element to the heating element in order consequently to heat up the process air therein.

More preferably, the first condenser has at least two cooling stages with a respective cooling element, where the cooling element comprises a respective coolant. The respective cooling stages preferably have a dedicated cooling circuit with a coolant, and so the cooling outputs of the different cooling stages can be adjusted individually.

More preferably, each cooling stage, especially in the case of multiple cooling stages in one condensation step, has a respective coolant, i.e. the first cooling stage has a first coolant and the second cooling stage has a second coolant. The cooling stages may optionally also have respectively separate cooling circuits. The heat withdrawn from the process air in the cooling operation can then be added to the process air in a further treatment step. The heat displacement can thus take place between the condensation step and the further treatment step by means of the coolant, i.e. heat energy from the process air can be transferred from the condensation step to the further treatment step. The coolant, especially a cooling liquid, may thus assure a high cooling output in the cooling stage. In particular, the cooling output in an air-water heat exchanger may be higher than an air-air heat exchanger. Preferably, even in the first cooling stage, a coolant is used for cooling of the process air, where the heat withdrawn from the process air in the first cooling stage is added to the process air in a further treatment step. The heat displacement can simply be implemented by means of pumped circulation of coolant. The heat displacement can optionally also be implemented by means of a heat pump.

Optionally, but more preferably, the process air is subjected to further treatment in the main stream in the first condenser downstream of the branch. A heating element operated with externally heatable power may likewise optionally be disposed in the first condenser as first heating element, irrespective of whether heat is recovered in the first condensation step. Optionally, the first heat exchanger can return the heat recovered back to the process air outside the first condenser. In particular, the heat recovered can optionally be fed to the industrial process.

More preferably, the apparatus has a first air heater disposed behind the first condenser, preferably behind an air inlet for supply of air outside the main stream. Preferably, the first air heater can improve the drying property of the process air for the industrial process, for example further heat up the process air and lower the relative humidity of the process air. The preferred positioning of the first air heater behind the first condensation step has the advantage that a significant proportion of solvent can already be condensed out of the process air in the first condensation step before the first air heater heats up the process air.

In a further preferred configuration of the invention, at least a portion of the process air, upstream of the first heating element, is guided into the secondary stream to the second condenser in a branch. In particular, the branching is effected in the first condenser prior to reheating of the process air by the first heating element. The branch may preferably be disposed in the first condenser between the first separator and the first heating element, i.e. a portion of the process air is branched off in the first condenser upstream of the first heating element after having already been cooled by the first cooling element and after the first condensate has been separated out by the first separator.

In a further preferred configuration of the invention, the second cooling element especially comprises a second heat exchanger for heat recovery in the second condensation step, wherein at least a portion of the process air, after the second condensation step, is subjected to further treatment in the second condenser which has a second heating element for heating of the process air.

Preferably, a portion of the process air is subjected to further treatment in the second condenser after the second condensation step, i.e. preferably behind the second cooling element and the second separator. More preferably, the second cooling element comprises the second heat exchanger. Likewise preferably, the second heating element is a heat exchanger connected to the second heat exchanger. In the case of further treatment in the second condenser, more preferably, the heat withdrawn from the process air in the second heat exchanger the process air is heated up again with the second heating element via a heat pump. In particular, a heat exchanger of the heat pump may be disposed within or else outside the second condenser. The second heating element disposed in the second condenser may likewise be an electrically powered heating element. Optionally, the second heat exchanger can return the heat recovered back to the process air outside the second condenser. In particular, the heat recovered can optionally be supplied to the industrial process.

The process air is preferably conditioned in the second condenser such that the process air is matched to a further treatment in a second further treatment apparatus. For example, it may be necessary for the process air to have to be conditioned to a certain temperature and/or a certain pressure in order that the processes that take place in the second further treatment apparatus, for example an adsorption, can proceed with maximum effectiveness.

In a further preferred configuration of the invention, a second further treatment apparatus is disposed downstream of the second condensation step, wherein the process air is subjected to further treatment by the second further treatment apparatus which comprises a filter, and/or a third condenser, and/or a concentrator.

More preferably, the second further treatment apparatus comprises an activated carbon filter which can, for example, remove further solvent constituents still present in the process air, in order to comply with particular legal emissions limits in the case of release into the environment.

In particular, the second further treatment apparatus may alternatively optionally include a third condenser in order to treat the process air by a third condensation step. In this case, the third condenser may be connected in series with the second condenser, i.e. the process air can preferably always be passed through the second condenser before the process air is treated in the third condenser. It is likewise conceivable to arrange multiple third condensers parallel to one another.

Optionally, the second further treatment apparatus comprises a concentrator that can remove solvent constituents from the process air by adsorption.

The second further treatment apparatus, in a further embodiment, may have any combination of a filter, a condenser and a concentrator. It is conceivable, for example, that the second further treatment apparatus is used for removal of different solvent constituents, and a combination of a filter with a condenser or with a concentrator may be advisable.

In a further preferred configuration of the invention, the apparatus of the invention has a first condensate collector and a second condensate collector, wherein the first condensate is collected in the first recovery process for recycling into the industrial process, and wherein the second condensate is collected in the second recovery process for recycling into the industrial process.

The first and second condensate collector may each be an intermediate storage means, a reservoir or a vessel which may be disposed in the respective condenser or else outside the respective condenser. This is because the respective condensate collector differs from a conduit in that the condensate collector has a primary purpose of collecting rather than transporting.

In particular, the respective condensate collector may be part of an apparatus that reprocesses the respective condensate for recycling into the industrial process. In particular, distillation is possible by means of such an apparatus in order to enrich the respective solvent constituent of the condensate for the industrial process.

In a further preferred configuration of the invention, the second condenser has a deicing apparatus. According to the invention, the process air can be cooled down in the second condenser to a temperature at which ice deposits can form on the cooling fins of the second cooling element or in the second separator. Ice deposits are unwanted since they can distinctly impair the thermal conductivity of the cooling fins or the functioning of the second separator. The deicing apparatus can ensure that the second condenser can be freed of ice deposits after particular intervals of operation.

In particular, the deicing apparatus preferably comprises a heater that can either directly heat the components to be deiced, or the process air is heated thereby indirectly such that the deposited ice can be melted off the components. Optionally, deicing agent can be applied to the components to be deiced, such that the corresponding surfaces can be freed of the ice. In particular, the deicing can take place in a subregion of the second condenser, i.e. locally or in parts, during the ongoing condensation. Likewise conceivable is a deicing apparatus with an anticipatory deicing method in which relevant operating parameters are recorded and monitored in order that the deicing agent can be applied in good time to the surfaces to be deiced such that ice deposits can be inhibited from the outset, in order to constantly assure the function of the second condenser. Optionally, the deicing apparatus may comprise a heater for heating the components to be deiced and simultaneously the use of deicing agents. Such a combination of the deicing apparatus can advantageously accelerate the deicing.

The second condensation step may—as described above—comprise at least two parallel substreams with condensers arranged correspondingly in parallel. In the case of deicing in a condenser, the feed of process air may thus be diverted at least partly, preferably essentially completely, into another condenser, such that the second condensation step takes place continuously and need not be interrupted.

In particular, the deicing apparatus may have a signal transducer, such that the supply of at least a portion of the process air to the second condenser can be intermittently interrupted. Preferably, the deicing apparatus may communicate with a control unit, for example the first control unit, such that a valve for guiding of process air, for example the first valve, can be correspondingly actuated.

In a further preferred configuration of the invention, the industrial process comprises the coating of a conductive carrier material, especially a conductive film material, with a solvent-containing substance mixture as coating, and drying after application of the coating on the carrier material, giving rise to solvent-containing process air which is fed to the apparatus.

WORKING EXAMPLES

The invention is elucidated in detail hereinafter by a number of working examples, without specific distinction between the different categories of claim. Furthermore, it is made clear that the proposal solutions to problems in the invention can be applied to various different industrial processes.

LIST OF FIGURES

Figure 2:
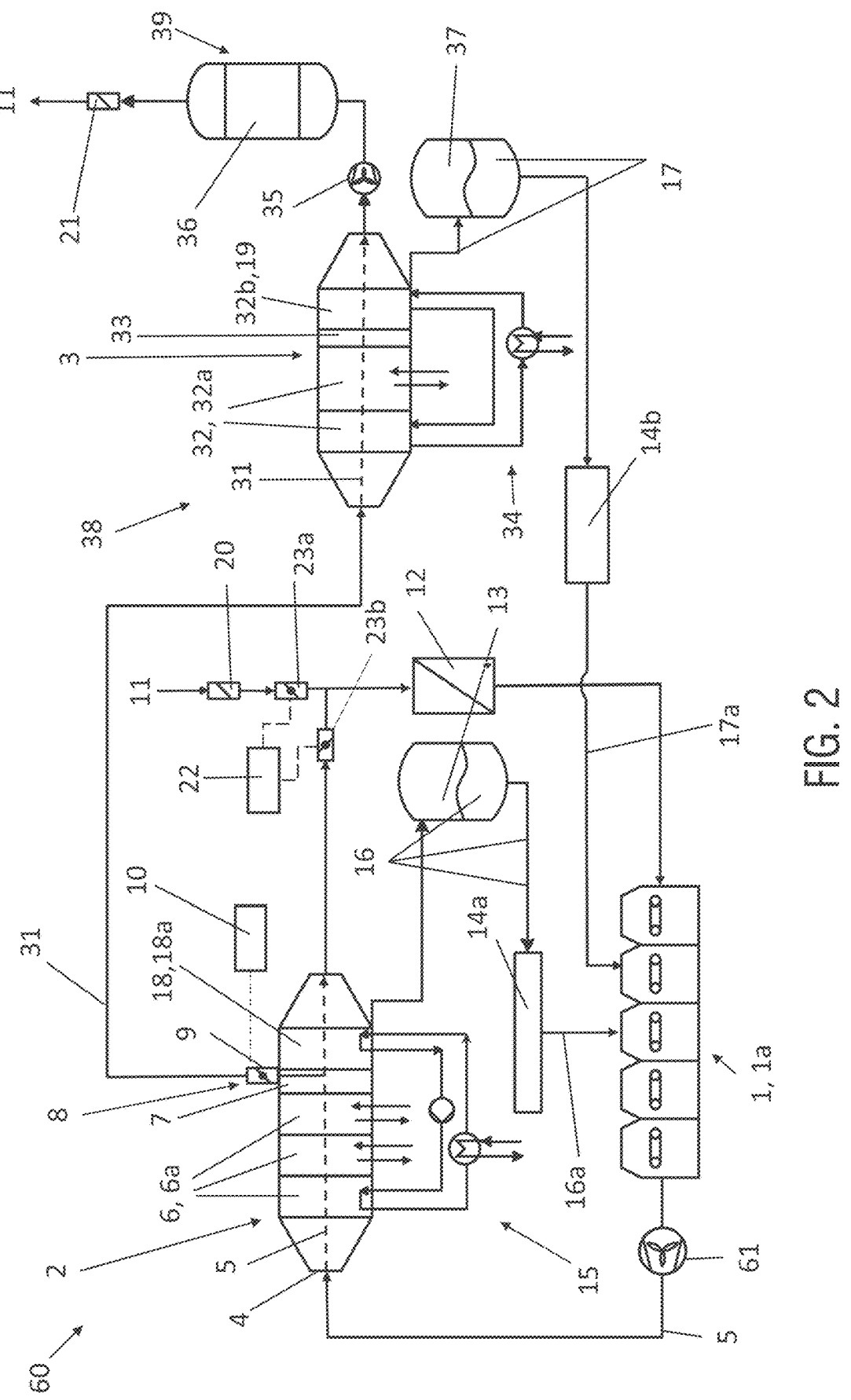
Figure 3:
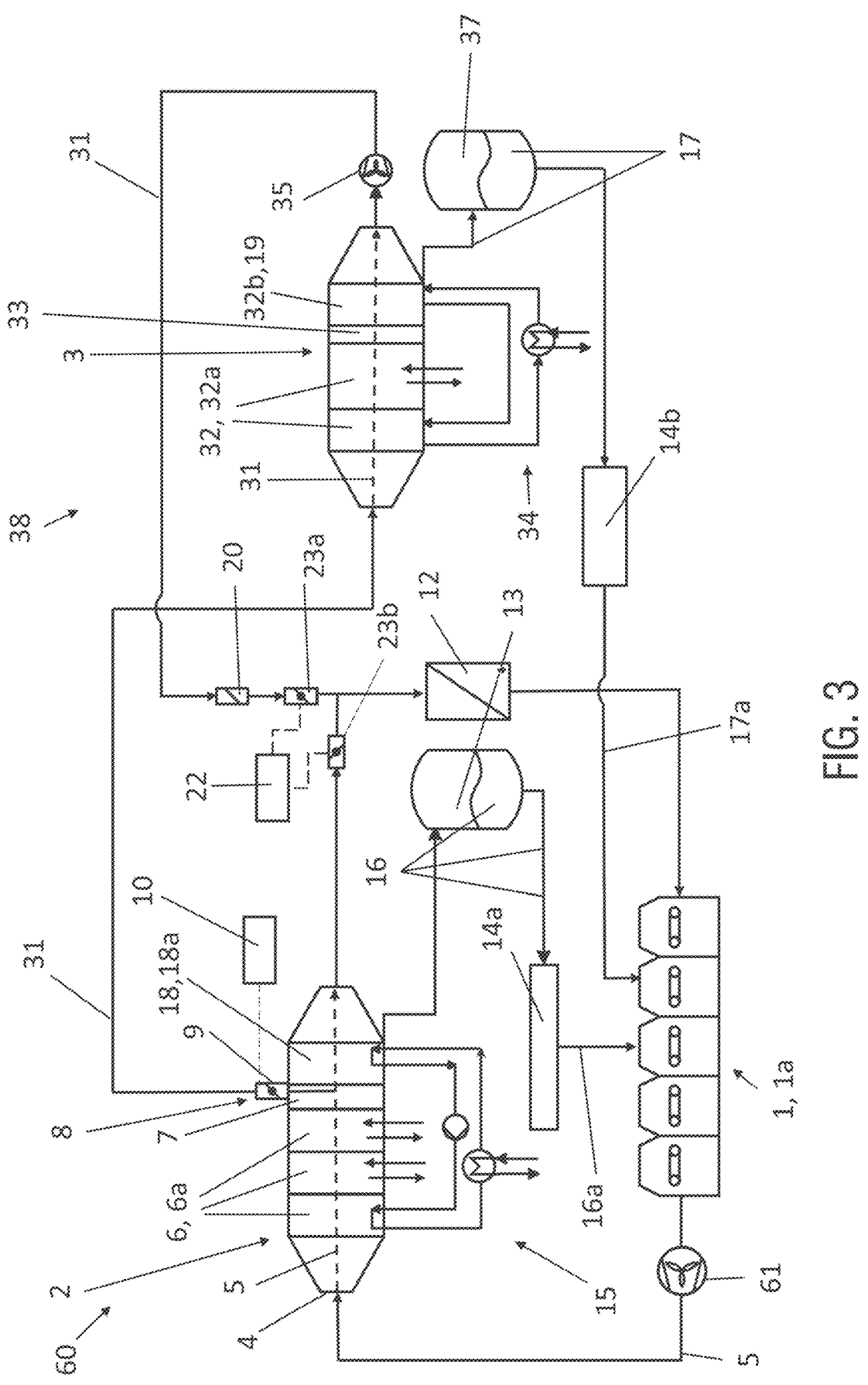
Figure 4:
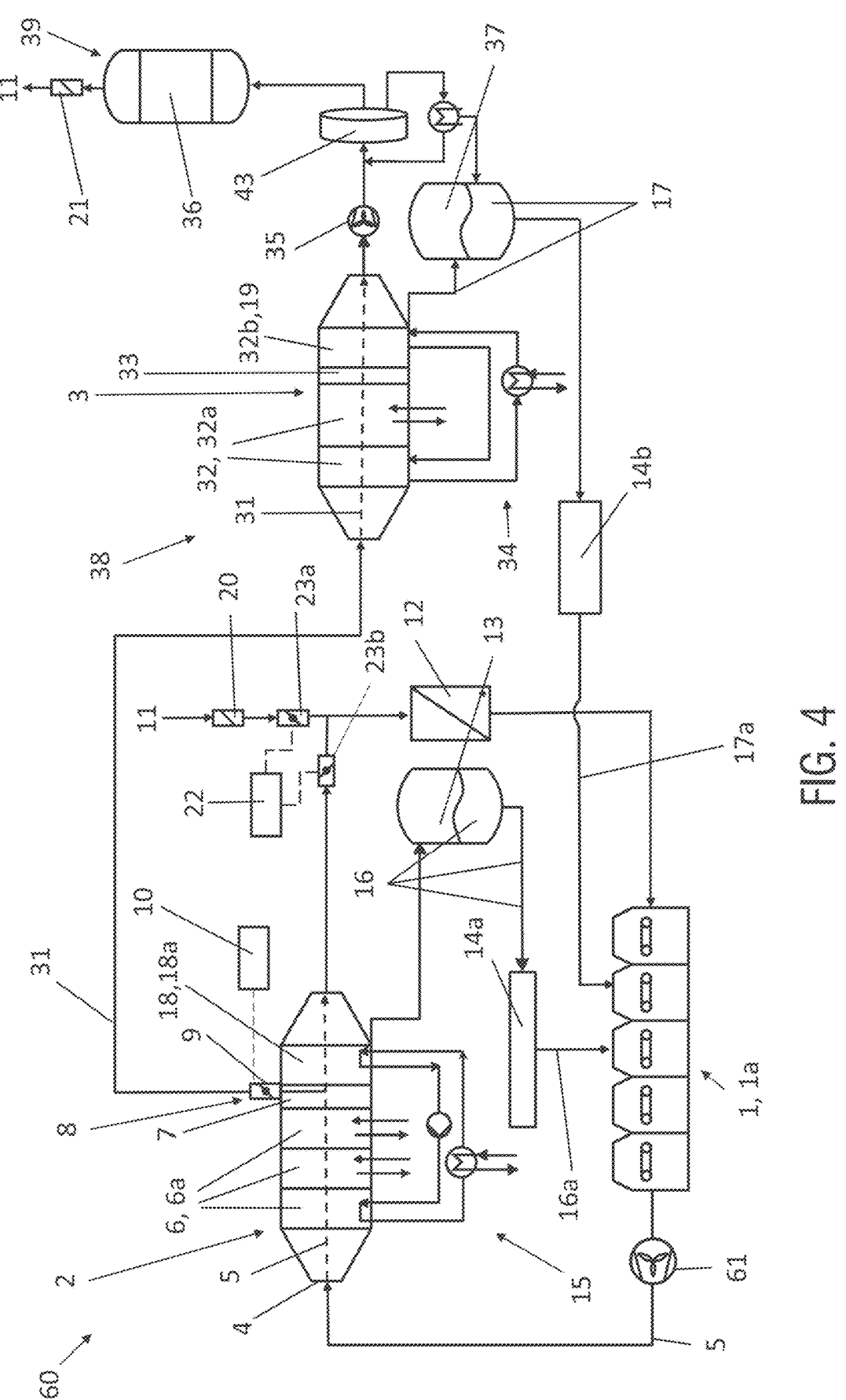
Figure 5:
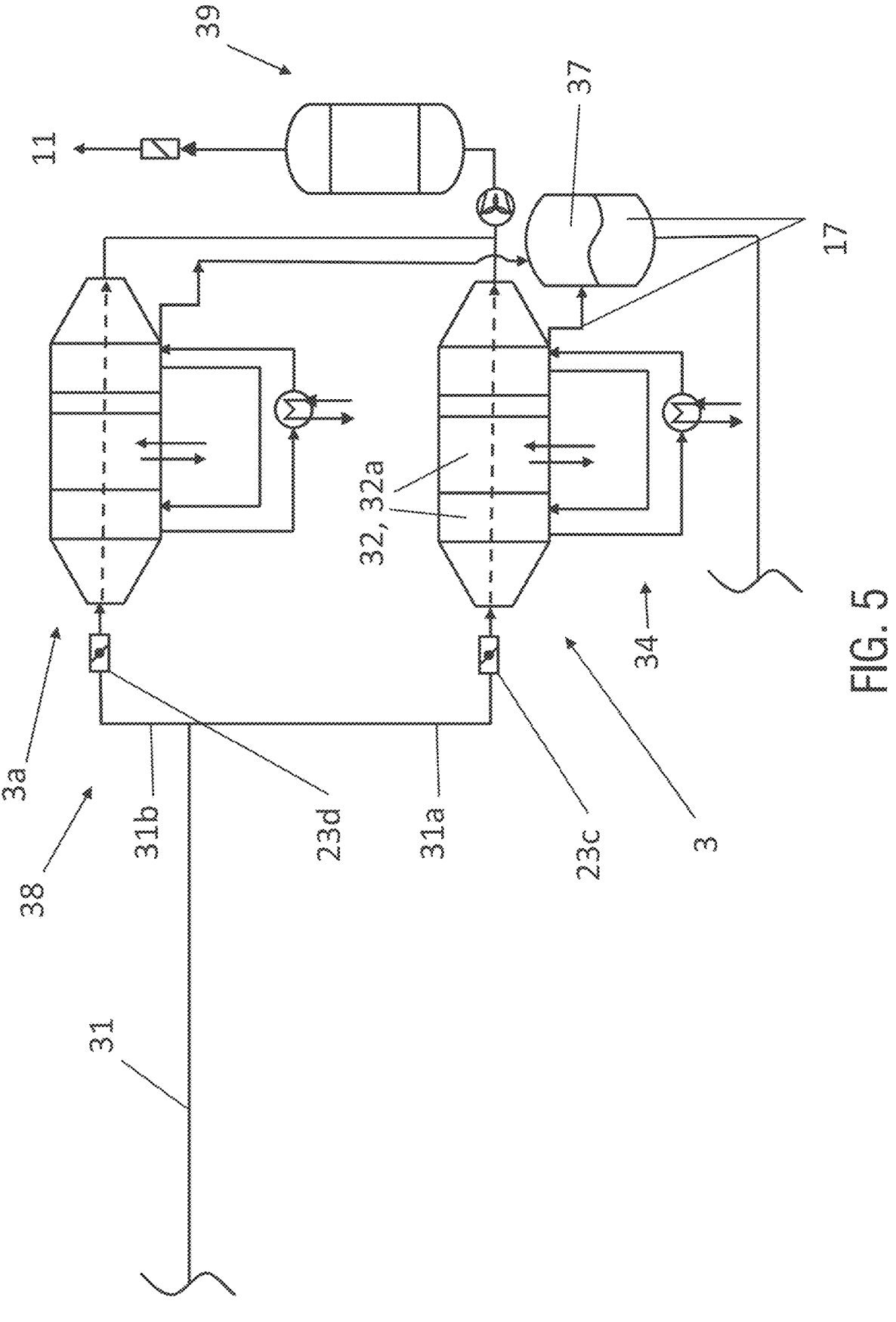
Figure 6:
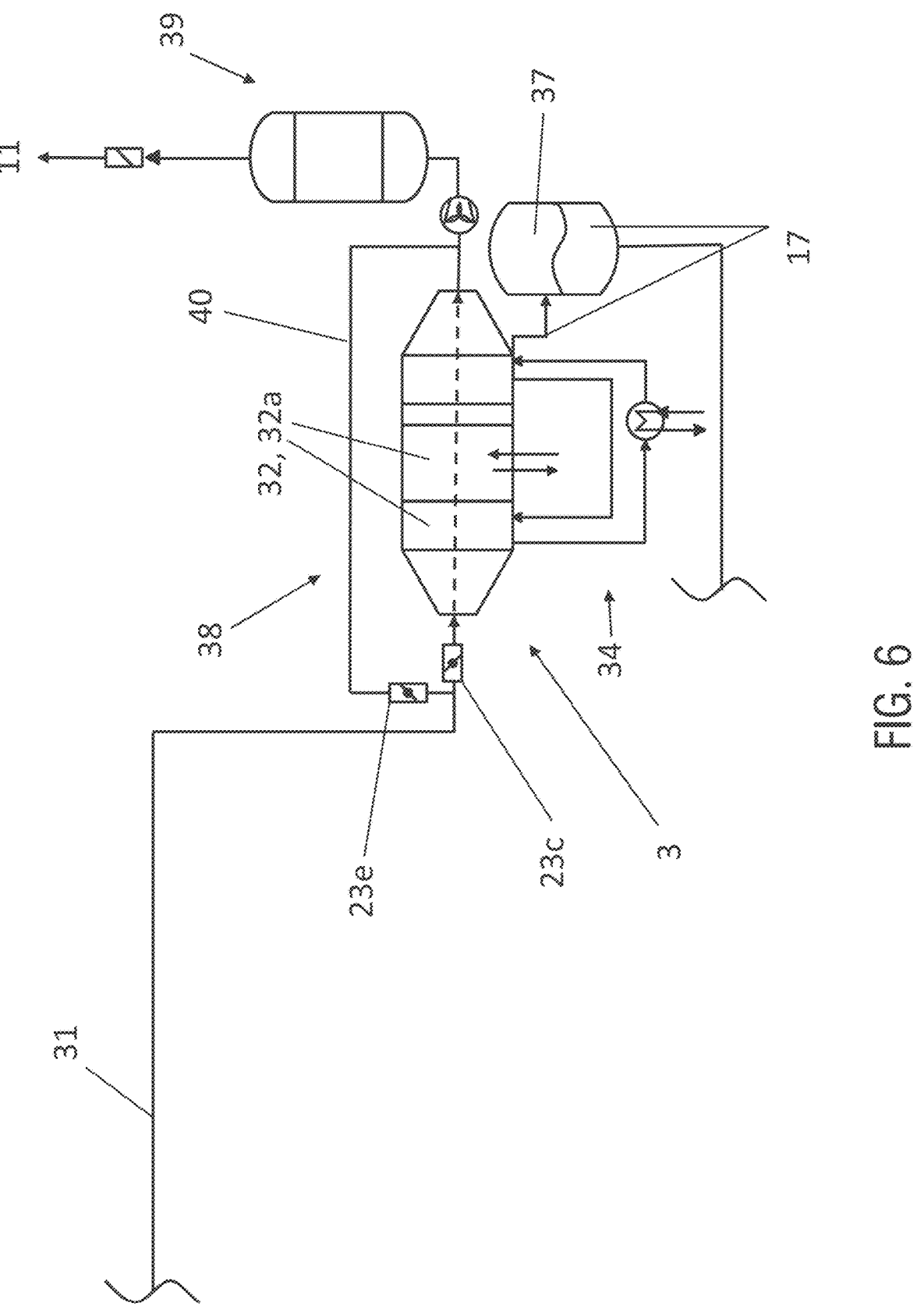
Figure 7:
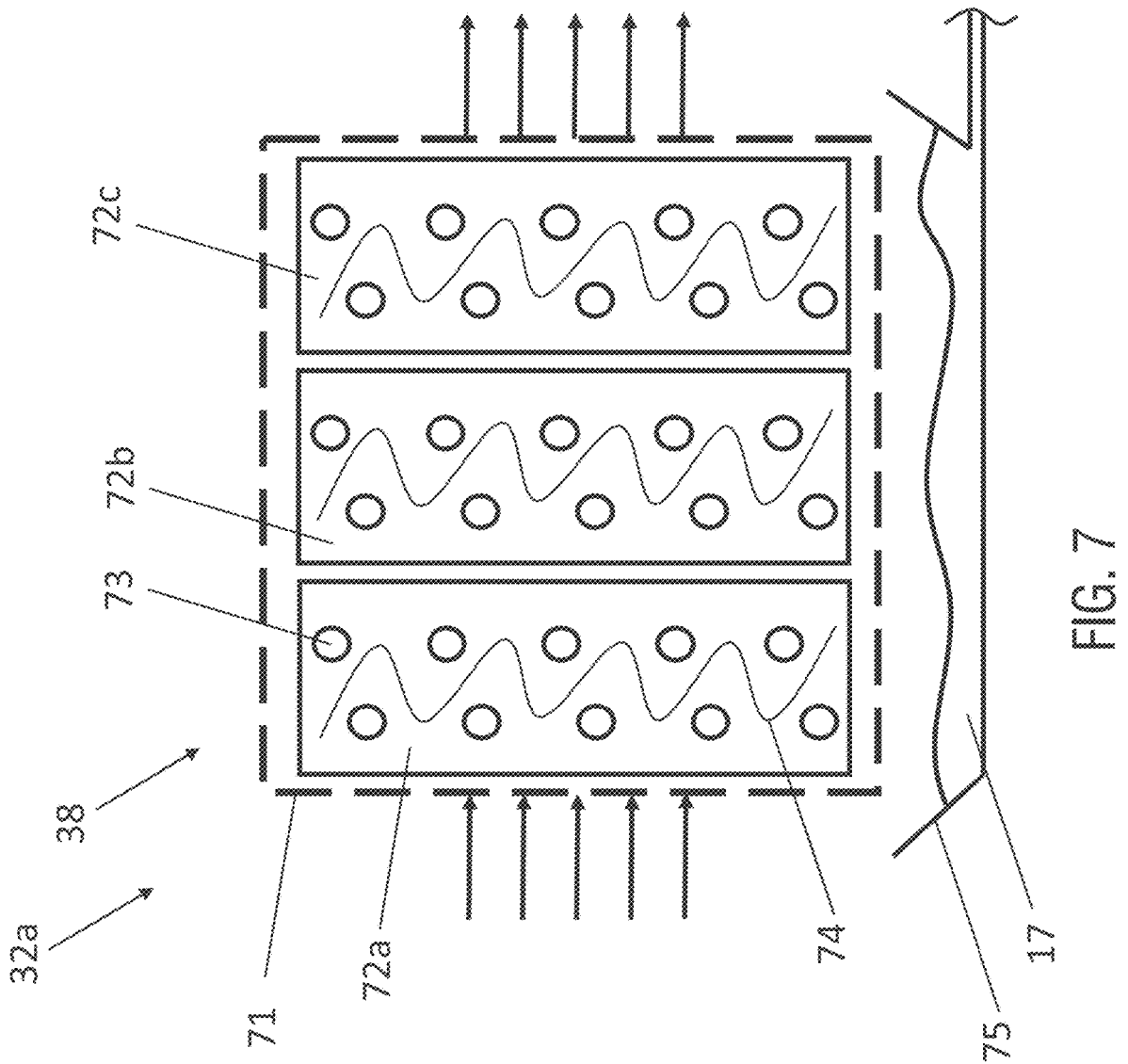

The figures show:

FIG. 1 a schematic diagram of a method of the invention for treatment of process air from an industrial process for drying of an electrode coating;

FIG. 2 a schematic diagram of an apparatus of the invention for treatment of process air from an industrial process for drying of an electrode coating;

FIG. 3 a schematic diagram of an alternative apparatus of the invention in a method of the invention for treatment of process air from an industrial process;

FIG. 4 a schematic diagram of a further alternative apparatus of the invention in a method of the invention for treatment of process air from an industrial process;

FIG. 5 a modification of FIG. 2 with an alternative arrangement for treatment of process air from the secondary stream;

FIG. 6 a modification of FIG. 2 with a further alternative arrangement for treatment of process air from the secondary stream; and FIG. 7 a schematic cross section of a subregion of the heat exchanger as an optional execution in the second condenser from FIG. 2.

Figure 8:
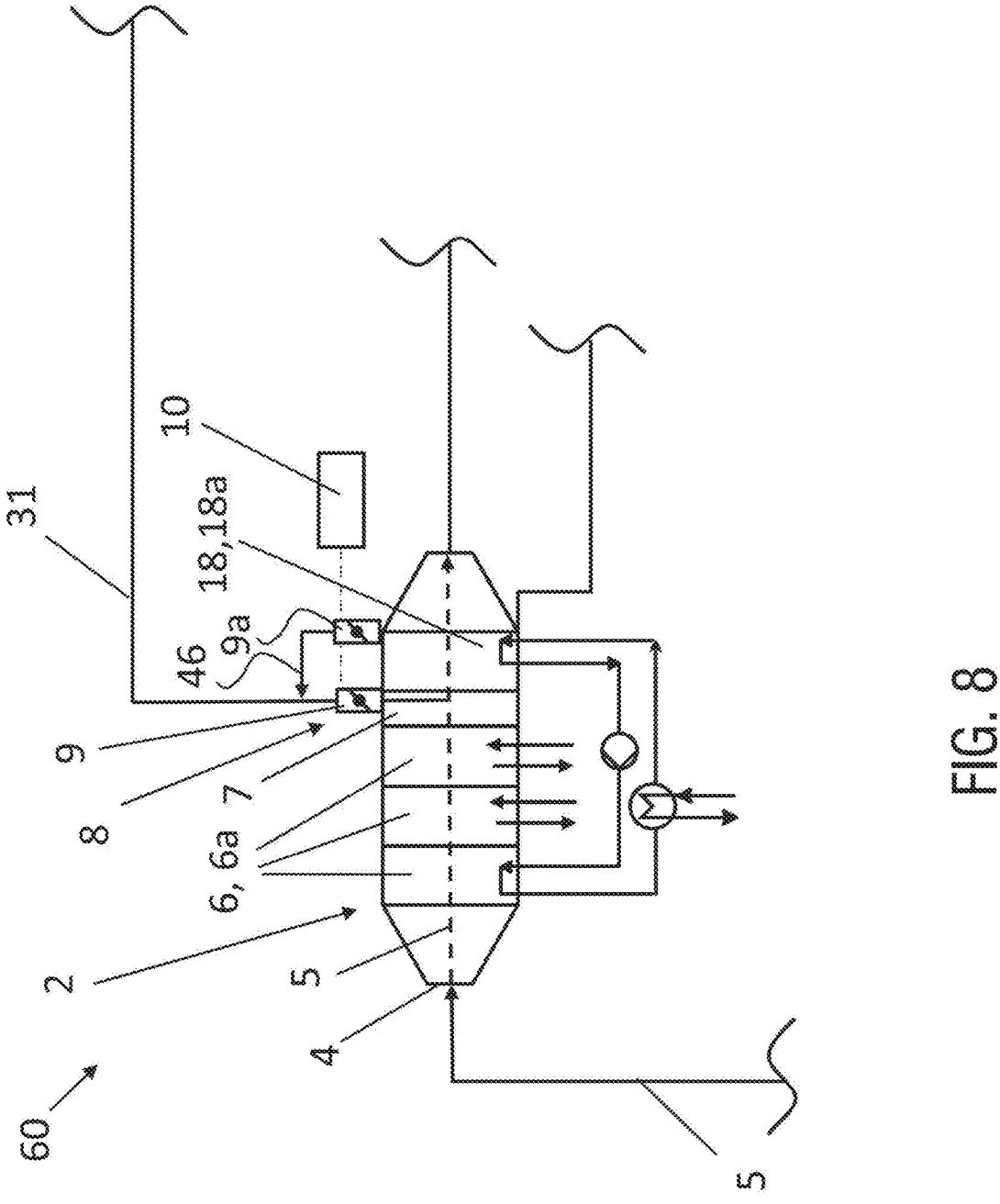
Figure 9:
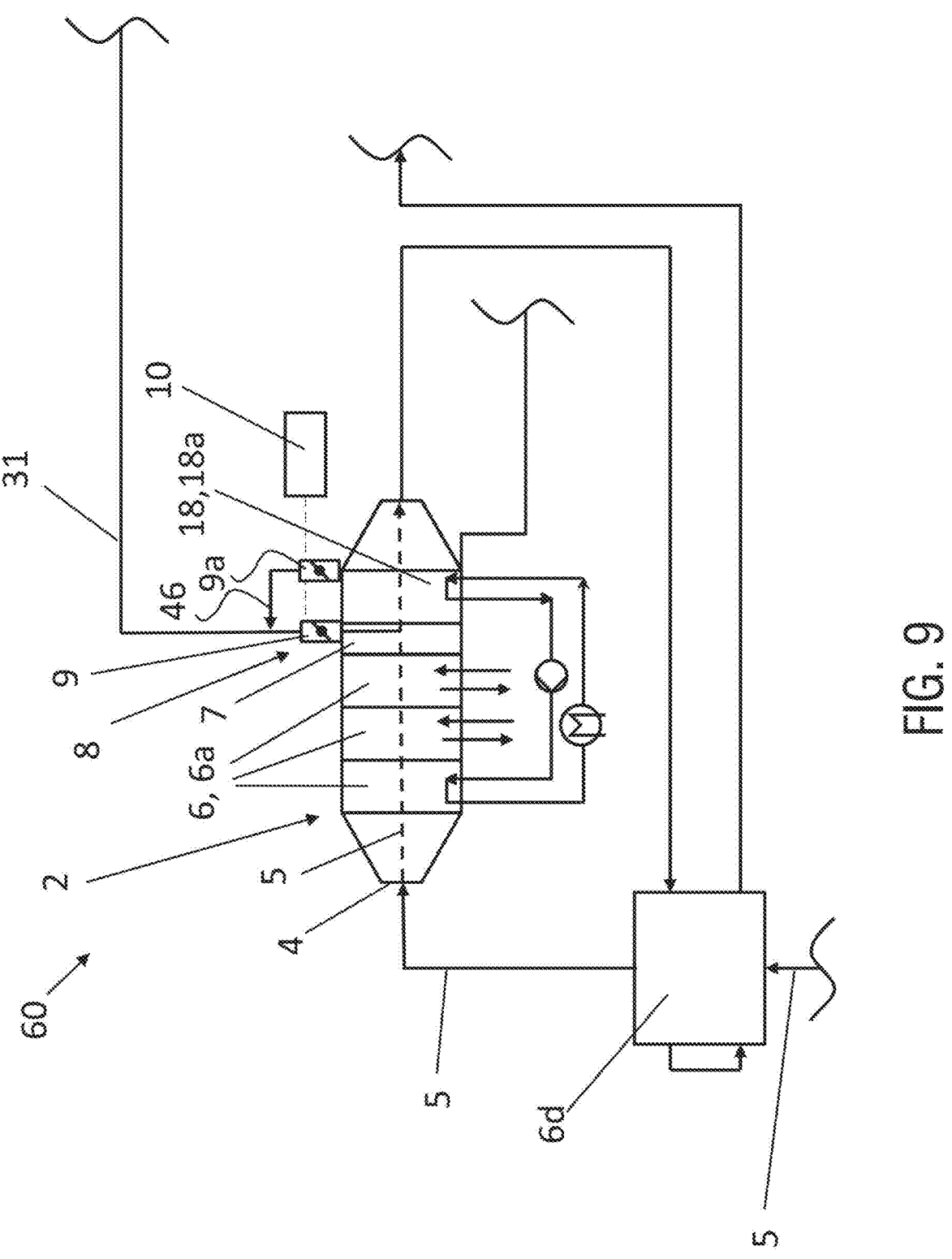

FIG. 8 a further modification of FIG. 2 with an auxiliary conduit;

FIG. 9 an alternative execution according to FIG. 8 with an air-air heat exchanger.

PREFERRED EXECUTION OF THE INVENTION

In the production of electrodes for lithium ion batteries and the like, it is possible to apply a wet coating in the form of a slurry or paste to a carrier material. According to the invention, this is done in an industrial process which is performed on an industrial scale in an industrial plant 1, 1*a*. The carrier material used here is preferably an electrically conductive, two-dimensional substrate, especially a conductive or metallic foil. The wet coating preferably includes constituents composed of fine powders that are mixed with a binder. The binder used is typically a polymer that may be water-soluble. In some cases, the binder is dissolved in an organic solvent, such as NMP, TEP, EAA, acetone, various alcohols or similar industrial solvents, and optionally also mixtures thereof. Such solvents are suitable for dissolving the organic binder in order to obtain a layer-forming fluid, especially a paste or liquid. Such fluids may be applied to at least one side of the carrier material to form a coating. In these cases, a wet coating is applied continuously or discontinuously to a moving carrier material and dried in an oven or dryer. In the course of drying, solvent is typically removed, which results in solidification of the coating applied. In typical cases in which both sides of the foil are to be coated, a first coating is applied continuously to a moving carrier material and dried in an oven or dryer, followed by the application of a second wet coating, which is then dried in a second drying step.

In a particularly preferred embodiment for production of battery electrodes, the wet suspension is applied to both sides of the carrier material and then dried in an oven or dryer. This arrangement is referred to as simultaneous double-sided coating and drying. In the case of production of lithium ion electrodes, this arrangement is particularly advantageous with regard to increasing productivity, since it requires only one drying step after the application of the wet coating suspension to both sides.

The volatile organic compounds (VOC) which, in particular as a result of the drying process in the dryer or oven, are transferred substantially in vaporous form into an oven atmosphere and hence into a process air, in the present context, are condensed in accordance with the invention together with water and other potential impurities in condensers for recovery of solvent (for example NMP, TEP, EAA, DMAc). Subsequently, the process air passes through apparatuses for deposition of fine droplets (demister, droplet separator). In most drying processes, at least a portion of the air exiting from the condensation step is released into the atmosphere, while the rest of the air can be returned to the dryer. For many solvents, the concentration exiting from the condenser operation is well above the accepted limits for release into the atmosphere. Moreover, the recovery of such solvents can be cost-effective and desirable. Therefore, in general, additional downstream cleaning devices for limitation of emissions are required to lower the VOC concentration to permissible values. VOC cleaning methods include thermal (catalytic and pure thermal) oxidation methods, carbon adsorption and adsorption with the aid of various adsorption media such as zeolite, activated carbon etc.

FIG. 1 shows a schematic of an example of a method of the invention for treatment of process air from an industrial process for production of lithium ion batteries. In the method according to FIG. 1, an electrode coating process 1*a* takes place, preferably using a solvent composed of a combination of TEP and EAA. The process air is used to dry the wet electrode coating containing TEP/EAA solvent.

In the method of the invention, the process air is guided in a main stream 5 to a first condensation step 41, wherein the process air is filtered. A filtration step 4*a* thus serves to separate the process air from coarse particles that have formed in the electrode coating process 1*a*. In the first condensation step 41, the process air is cooled down gradually from 120° C. on entry into the first condensation step 41 down to 15° C. In this way, a first condensate 16 is separated out of the process air and fed to a first recovery process 42. In the first condensation step, the process air can be cleaned such that the concentration of TEP/EAA solvent in the process air can be reduced from typically about 4000 ppm on entry into the first condensation step to, for example, about 300 ppm on exit (i.e. reduced by a factor greater than 10). In the recovery process 42, the first condensate 16 is collected and also preferably treated by a distillation and condensate reprocessing operation (not shown). In this operation, the first condensate 16, containing TEP/EAA solvent for example, is enriched to give a first enriched condensate 16*a*, separated if required into the different solvent constituents (TEP and EAA), and then fed back to the electrode coating process 1*a*.

After the process air in the main stream has been treated by the first condensation step 41, a secondary stream 31 is branched off from the main stream via a branch 44 and is then guided to a second condensation step 51. The volume flow branched off in the secondary stream 31 corresponds typically to about 10% of the existing volume flow that remains in the main stream 5 downstream of the branch 44 and is guided to a first further treatment step 45.

In the main stream 5, the process air, downstream of the branch 44, is conditioned in the first further treatment step 45 for the electrode coating process 1*a* in that the process air is first heated, then optionally supplemented with air from the environment and then—at least optionally—heated. After the first further treatment step 45, the process air in the main stream 5 is fed back to the electrode coating process 1*a*. The main stream 5 is also called recirculation stream or "makeup air".

Downstream of the branch 44, the process air branched off into the secondary stream 31 is guided to the second condensation step 51. The branched-off process air is preferably at a temperature of 15° C. on entry into the second condensation step 41. The process air is cooled down gradually therein down to –20° C., for example, wherein a second condensate 17 is separated out of the process air and fed to a second recovery process 52. In the second condensation step, the process air can be cleaned such that the concentration of TEP/EAA solvent in the process air of typically about 300 ppm on entry into the second condensation step can be reduced to typically about 50 ppm on exit.

Deposition of ice can occur especially because of the low temperature of the process air in the second condensation step 51. In order to counteract deposition of ice, after a particular interval of operation, deicing can take place in the second condensation step. During deicing, the feed of process air in the secondary stream 31 to the second condensation step 54 is interrupted intermittently.

In the recovery process 52, the second condensate 17 is collected and also treated by a distillation and condensate reprocessing operation (not shown). In this operation, the second condensate 17 is processed to give a second enriched condensate 17*a* that especially contains TEP/EAA solvent, separated into the respective solvent constituents (TEP and EAA) and fed back to the electrode coating process 1*a*.

The process air present in the secondary stream 31, after the second condensation step 51, is treated by a second further treatment step 54. The temperature of the process air is first adjusted to 15° C., then it is filtered and finally released into an environment via a discharge step 55. This is because the filtering in the second further treatment step 54 ensures that the solvent constituents in the process air are removed such that it is possible to comply with the legal emissions limits.

FIG. 2 shows a schematic of a working example of an apparatus of the invention which is intended for execution of the method according to FIG. 1.

Reference numeral 1 indicates an illustrative electrode coating plant in which electrodes for production of lithium ion batteries are coated, where the abovementioned solvent composed of a mixture of TEP and EAA is used. The process air from the electrode coating process 1*a* is conveyed by a fan 61 into the main stream 5 to a first condenser 2 and preferably guided through a filter 4 before entry into the first condenser 2. The temperature of the process air is typically about 120° C. on entry into the first condenser 2 and is gradually lowered down to 15° C. in a first cooling element 6. The first cooling element 6 has an optionally three-stage heat exchanger 6*a* in which heat is withdrawn from the process air. In the first stage of the heat exchanger 6*a*, the process air is cooled down from 120° C. on entry to typically about 60° C., in the second stage to typically about 40° C., and finally in the third stage to typically about 15° C. The heat withdrawn in the first stage is transferred via a heat pump 15 to a first heating element 18 in the form of a heat exchanger. The first heating element 18 serves to ultimately return the heat withdrawn in the heat exchanger 6*a* to the process air in the main stream 5. The heat withdrawn in the second and third stages is also optionally fed via separate heat pumps to a further process (not shown); for example, the heat can be coupled into the electrode coating process 1*a*.

The heat exchanger 6*a*, for each stage, has in each case a cooling body with vertical cooling fins, through which the process air is passed. The cooling gives rise to the first condensate 16 at the surface of the cooling fins, which is then led away by gravity into a collecting vessel disposed beneath the first cooling element 6. As a result of the cooling in the first cooling element 6, there is occasional aerosol formation, giving rise to aerosols that are carried by the main stream through the first condenser. Behind the first cooling element 6 is therefore preferably disposed a first separator 7 designed as a "demister" or impingement separator composed of a wire mesh for deposition of fine droplets. The process air flows through the first separator 7, as a result of which first condensate 16 is once again obtained and is led off by gravity into the collecting vessel disposed beneath the first cooling element 6.

The first condensate 16 separated out includes a first solvent 16*a* which may comprise a mixture of TEP and EAA together with various by-products having similar condensation properties. The first condensate 16 is pumped out of the collecting vessel into a first condensate collector 13 outside the first condenser 2 and distilled in a condensate reprocessing plant 14*a* for recycling into the electrode coating process 1*a*, where the first condensate 16, in the condensate reprocessing plant 14*a*, is separated into its respective solvent constituents (TEP and EAA) and enriched.

Behind the first separator 7, a portion of the process air is branched off from the main stream 5 by a first valve 9 of a diversion apparatus and diverted into the secondary stream 31 to a second condenser 3. A second cooling element 32 is an essential component of the second condenser 3 and has a two-stage heat exchanger 32*a* in which heat is withdrawn from the process air. In the first stage, the process air is cooled down from 15° C. to –5° C., and in the second stage to –20° C. The heat withdrawn in the first stage is transferred via a heat pump 34 to a second heating element 19 designed as a heat exchanger. The heat withdrawn beforehand is at least partly added again to the process air in the secondary stream 31 via the second heating element 19. The heat withdrawn in the second stage, if required, is added via a separate heat pump to a further process (not shown). Both the separation of a second condensate 17 and the configuration of a second heat exchanger 32*a* and a second separator 33 (demister) are preferably analogous to those in the case of the first condenser 2. The second condensate includes a second solvent 17*a*, where the second solvent 17*a* may preferably have the same composition (TEP and EAA) as the first solvent 16*a*. The second condensate 17, just like the first condensate 16, is pumped from the collecting vessel into the second condensate collector 37 outside the second condenser 3 and distilled in a condensate reprocessing plant 14*b* for recycling into the electrode coating process 1*a*, in which condensate reprocessing plant 14*b* the second condensate 17 is separated into its respective solvent constituents (TEP and EAA) and enriched.

The second condenser 3 preferably additionally has a deicing apparatus 38, which has an electrically powered heater (not shown) in the second cooling element. The deicing apparatus 38 can also heat up the deposited condensate 17 including the solvent 17*a* composed of a TEP/EAA mixture and use it as a deicing agent in the second cooling element 32. The deicing apparatus 38 may alternatively have incoupling of heat into a heat exchanger of the second condenser, which heats up certain heat transfer surfaces of the second cooling element 32, in order to free the heat transfer surfaces of ice. Before the second condenser is deiced by the deicing apparatus 38, the feed of process air is interrupted by sending a signal to the first control unit 10 for control of the first valve 9, as a result of which the first valve 9 is closed.

Behind the second separator 33, the process air of the secondary stream 31 is heated up to 10° C. by the second heating element 19 with the recovered heat from the second heat exchanger 32a. A second air heater 35 is disposed behind the second condenser 3, by means of which the process air is then heated further to 15° C. before the process air is guided into a second further treatment apparatus 39. In the second further treatment apparatus 39, the process air is filtered through an activated carbon filter 36 before ultimately being released into the environment 11 through an air outlet 21.

Behind the separator 7, the process air in the main stream 5 is heated up again from 15° C. to 60° C. by the first heating element 18 before the process air leaves the first condenser 2 and is guided to a first air heater 12 for further conditioning.

A second and a third valve 23a, 23b are controlled by a second control unit 22, which can communicate with the first control unit 10. The second valve 23a is intended to regulate the amount of air from the environment 11 through an air inlet 20, and in so doing to adjust the amount of air in the main stream 5. In normal operation, the air inlet 20 can remain closed, and air inlets may be disposed as so-called "web slots" in the electrode coating plant 1, such that the amount of air fed to the electrode coating process 1a via the web slots corresponds to the amount of air branched off into the secondary stream 31.

The air fed in from the environment 11 and the process air from the condenser 2, in the main stream 5, are directed through the first air heater 12 in which the air is heated up for the electrode coating process 1a and ultimately guided back into the electrode coating plant 1.

FIG. 3 shows a schematic of an alternative embodiment of an apparatus of the invention. The alternative embodiment is largely the same as the embodiment according to FIG. 2, and so reference is made to the description above by way of elucidation. In a departure from the embodiment according to FIG. 2, a recycle conduit 31 is provided here, by means of which the process air is returned again to the main stream 5 via the air inlet 20 in a secondary stream 31 behind the second condenser 3. In this alternative embodiment, the process air, rather than being released into the environment as waste air, is thus reused in an industrial process.

FIG. 4 shows a schematic of a further alternative embodiment of an apparatus of the invention. The alternative embodiment is largely the same as the embodiment according to FIG. 2, and so reference is made to the description above by way of elucidation. In a departure from the embodiment according to FIG. 2, the second further treatment apparatus, as well as an activated carbon filter 36, additionally comprises a concentrator 43 with zeolite as adsorbent. The process air in the secondary stream 31, behind the second condenser 3, is adjusted to a temperature of typically about 25° C. and guided through the concentrator 43. In the concentrator 43, the second solvent 17a including NMP is additionally removed by adsorption. The process air is purified in such a way that the concentration of solvent in the process air can be reduced from typically about 50 ppm on entry into the concentrator 43 to about 10 ppm on exit.

FIG. 5 shows a modification of the working example according to FIG. 2 with an alternative arrangement for treatment of process air from the secondary stream 31. For the sake of clarity, elements that are identical to the execution according to FIG. 2 have been omitted. The secondary stream 31 is divisible into two substreams 31a and 31b, each of which is guided to the second condenser 3 or to a parallel condenser 3a. The parallel condenser 3a is preferably of the same design as the second condenser 3 and is in a parallel arrangement. A fourth and a fifth valve 23c, 23d can be used to adjust the respective substreams through the second condenser 3 and the parallel condenser 3a. In a supplementary or alternative execution, the secondary stream 31 can be divided by means of an alternating flap (not shown) into the two substreams 31a and 31b. The fifth valve 23d generally remains closed and is opened on deicing of the second condenser 3. The second condenser 3 is deiced in an analogous manner to the description above with regard to the working example according to FIG. 2 with an electrical heating element disposed in the cooling element 32 or heat exchanger 32a. As an addition or alternative, heat can be coupled into the heat exchanger 32a for deicing; see the above description relating to FIG. 2. The cooling can preferably be intermittently interrupted by the cooling element 32 during the deicing in order to promote natural introduction of heat from the outside.

The parallel condenser 3a simultaneously offers a certain operational redundancy and can also be used, for example, in the case of maintenance of the second condenser 3. The parallel condenser 3a is (at least optionally) deiced analogously or identically to the deicing of the second condenser 3, but preferably at a different time than the deicing of the second condenser 3.

FIG. 6 shows a further modification of the working example according to FIG. 2 with an alternative arrangement for treatment of process air from the secondary stream 31. During deicing of the second condenser 3, the fourth valve 23c may be closed, with interruption of the feeding of process air to the second condenser 3. At the same time, the sixth valve 23e is opened in order that the process air can bypass the second condenser 3 via a bypass conduit 40. Optionally, process air is transferred via the bypass conduit 40 to a gas storage means (not shown) and stored temporarily therein. At a later juncture, the bypass conduit 40 is closed again, and the process air is again guided through the second condenser 3 (optionally including the intermediately stored amount of process air). It is thus possible to ensure that a certain flow of the secondary stream is maintained in spite of intermittent interruption of the feed into the second condenser 3.

FIG. 7 shows a schematic cross section of a subregion of the heat exchanger 32a as an optional execution in the second condenser from FIG. 2. The heat exchanger 32a has several cooling fins in fin sets 72a, 72b, 72c that are present in a separate arrangement in a housing 71. The deicing apparatus 38 has an electrical heating element 74 assigned to the respective surface of the cooling fins. In normal cooling operation, the electrical heating element 74 remains switched off, while coolant conducted in coolant conduits 73 flows through the respective fin set 72a, 72b, 72c. Heat is transferred here from the process air flowing past the cooling fins to the coolant. At the surfaces of the cooling fins, the second condensate 17 is deposited owing to condensation and is then guided by gravity into a collecting vessel 75. For example, the flow of coolant through the fin set 72a, i.e. the cooling of the fin set 72a, can be intermittently interrupted. In that case, the electrical heating element 74 can be switched on for thawing of ice, while operation of the fin sets 72b, 72c continues for cooling of the process air. The deicing can thus be conducted locally, i.e. solely in the fin set 72a of the heat exchanger 32*a*, while the process air can continue to condense elsewhere along the fin sets 72*b*, 72*c*.

FIG. 8 shows a further modification of the working example according to FIG. 2 with an auxiliary conduit 46, where the auxiliary conduit 46 is disposed downstream of the branch disposed upstream of the first heating element 18 (alternatively 18*a*). Once the process air has been heated up by means of the heating element 18*a*, a portion of the heated process air is branched off into the secondary stream 31, and the process air is fed in in the secondary stream 31. The amount of process air branched off via the auxiliary conduit 46 is adjusted via the auxiliary conduit valve 9*a*. The supply of heated process air can especially lower the relative humidity of the process air in the secondary stream 31 and facilitate handling. For example, this can prevent unwanted condensation in the secondary stream conduit.

FIG. 9 shows an alternative execution of the working example according to FIG. 8 with an air-air heat exchanger, depicted here as crossflow heat exchanger 24. The crossflow heat exchanger 24 is assigned to the main stream 5, with guiding of the process air removed from the electrode coating plant to the crossflow heat exchanger 24 before entry into the first condenser 2. It is thus possible to withdraw thermal energy from the process air and to bring about a certain degree of precooling before the process air is guided to the first condenser 2. On the other hand, downstream of the first condenser 2, process air is guided to the crossflow heat exchanger 24, and the above-described withdrawn thermal energy is then supplied again to the process air before the process air is guided to the electrode coating plant 1. By means of the crossflow heat exchanger 24, the energy efficiency of the apparatus 60 can be further improved in that less thermal energy then has to be supplied to the process air for example by means of the first air heater 12 in order to arrive at a similar temperature level. Nevertheless, the precooling by means of the crossflow heat exchanger 24 can have the effect that less cooling output has to be provided in the first condenser 2 in order to cool the process air to a required temperature level.

The invention claimed is:

1. A method of treatment of process air from an industrial process having a main stream and a secondary stream, with a respective volume flow in the main stream and in the secondary stream, wherein at least a portion of the process air is treated by the following method steps:

a first condensation step in which a first condensate is separated out of the process air and fed to a first recovery process, a second condensation step that takes place after the first condensation step, in which a second condensate is separated out of the process air and fed to a second recovery process, wherein the lowest process air temperature attained in the second condensation step is lower than the lowest process air temperature attained in the first condensation step wherein a portion of the process air is branched off after the first condensation step from the main stream in a branch into the secondary stream for treatment by the second condensation step; and wherein the volume flow branched off into the secondary stream is smaller than the volume flow present in the main stream downstream of the branch.

2. The method as claimed in claim 1 for recovery of at least one solvent, wherein the first condensate includes a first solvent and the second condensate includes a second solvent, wherein first and/or second solvent comprise a hydrocarbon compound.

3. The method as claimed in claim 1, in which at least a portion of the process air is subjected to further treatment after the first condensation step in a first further treatment step, wherein the first further treatment step comprises at least one selected from the group consisting of: a supply of heat, a lowering of pressure, and a second feed of air outside the main stream, wherein at least a portion of the process air, after the first further treatment step, is returned to an industrial process.

4. The method as claimed in claim 3, in which the first further treatment step takes place downstream of the branch.

5. The method of claim 4, in which the first further treatment step takes place downstream of the branch with supply of heat in the first further treatment step.

6. The method as claimed in claim 1, in which at least a portion of the process air is subjected to further treatment in a second further treatment step downstream of the second condensation step, which second further treatment step comprises at least one selected from the group consisting of: a supply of heat, a lowering of pressure, a filtering operation, a third condensation step, and an adsorbing operation.

7. The method as claimed in claim 6, in which at least a portion of the process air downstream of the second further treatment step is fed to an environment.

8. The method as claimed in claim 6, in which at least a portion of the process air downstream of the second further treatment step is returned to an industrial process.

9. The method as claimed in claim 1, in which at least a portion of the process air from the industrial process is guided into the main stream and at the same time filtered.

10. The method as claimed in claim 1, in which the industrial process comprises a drying process.

11. The method as claimed in claim 1, wherein the method comprises collecting the first condensate in the first recovery process and/or collecting the second condensate in the second recovery process for recycling into an industrial process.

12. The method as claimed in claim 1, wherein the method comprises recovery of heat in the first and/or second and/or third condensation step.

13. The method as claimed in claim 1, in which a deicing step takes place in the second condensation step, wherein the deicing step comprises at least one selected from the group consisting of:

intermittently interrupting the feed of at least a portion of the process air to the second condensation step, bypassing at least a portion of the process air from the second condensation step, and dividing the feed of the process air to the second condensation step into a plurality of substreams, wherein the deicing takes place in one of the plurality of substreams.

14. An apparatus for treatment of process air from an industrial process, with a main stream, a first condenser comprising a first cooling element, a first heating element, and a first separator, wherein the process air is guided in the main stream to the first condenser, cooled by the first cooling element within the first condenser, and then passed through the first separator, wherein a first condensate is separated out of the process air and fed to a first recovery process, a second condenser, connected downstream of the first condenser, comprising a second cooling element and a second separator, wherein the process air is cooled by the second cooling element within the second condenser and then passed through the second separator, wherein a second condensate is separated out of the process air and fed to a second recovery process a branch from the first separator, wherein a portion of the process air, upstream of the first heating element, is branched off from the main stream in the branch into a secondary stream to the second condenser.

15. The apparatus as claimed in claim 14, having a diversion apparatus, wherein at least a portion of the process air is branched off into a secondary stream downstream of the first separator in a branch, wherein the diversion apparatus comprises at least one selected from the group consisting of: a first valve and a fan for guiding at least a portion of the process air.

16. The apparatus as claimed in claim 14, wherein the first cooling element comprises a first heat exchanger for recovery of heat in the first condenser, wherein at least a portion of the process air is subjected to further treatment in the first condenser after the first condensation step, wherein a first air heater is disposed downstream of the first condenser.

17. The apparatus as claimed in claim 14, wherein the second cooling element comprises a second heat exchanger for recovery of heat in the second condensation step, wherein at least a portion of the process air is subjected to further treatment in the second condenser after the second condensation step, wherein the second condenser comprises a second heating element for heating of the process air.

18. The apparatus as claimed in claim 14, wherein a second further treatment apparatus is disposed downstream of the second condenser, wherein the process air is subjected to further treatment by the second further treatment apparatus, wherein second further treatment apparatus comprises at least one selected from the group consisting of:

a filter, a third condenser, and a concentrator.

19. The apparatus as claimed in claim 14, having a first condensate collector, wherein the first condensate is collected in the first recovery process for recycling into the industrial process, a second condensate collector, wherein the second condensate is collected in the second recovery process for recycling into the industrial process.

20. The apparatus as claimed in claim 14, wherein the second condenser has a deicing apparatus.

21. The apparatus as claimed in claim 14, wherein the industrial process comprises the coating of a conductive carrier material, with a solvent-containing substance mixture as coating and drying after application of the coating on the carrier material, forming solvent-containing process air which is fed to the apparatus.

\* \* \* \* \*